(12) United States Patent
Wang et al.

(10) Patent No.: US 11,700,604 B2
(45) Date of Patent: Jul. 11, 2023

(54) SYSTEMS, METHODS, AND DEVICES FOR PUSCH DEFAULT BEAM IN MULTI-PANEL OPERATION

(71) Applicant: Intel Corporation, Santa Clara, CA (US)

(72) Inventors: Guotong Wang, Beijing (CN); Yushu Zhang, Beijing (CN); Alexei Davydov, Nizhny Novgorod (RU); Bishwarup Mondal, San Ramon, CA (US); Gang Xiong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 17/254,605

(22) PCT Filed: Sep. 26, 2019

(86) PCT No.: PCT/US2019/053086
§ 371 (c)(1),
(2) Date: Dec. 21, 2020

(87) PCT Pub. No.: WO2020/069075
PCT Pub. Date: Apr. 2, 2020

(65) Prior Publication Data
US 2021/0282167 A1    Sep. 9, 2021

Related U.S. Application Data

(60) Provisional application No. 62/847,060, filed on May 13, 2019, provisional application No. 62/739,044, filed on Sep. 28, 2018.

(51) Int. Cl.
*H04W 4/00*         (2018.01)
*H04W 72/1268*      (2023.01)
*H04W 76/11*        (2018.01)
*H04W 72/044*       (2023.01)
*H04W 72/23*        (2023.01)

(52) U.S. Cl.
CPC ..... *H04W 72/1268* (2013.01); *H04W 72/046* (2013.01); *H04W 72/23* (2023.01); *H04W 76/11* (2018.02)

(58) Field of Classification Search
CPC .......... H04W 72/1268; H04W 72/046; H04W 72/1289; H04W 76/11; H04B 7/0695; H04B 7/088; H04L 5/0044
USPC .................................................. 370/329, 330
See application file for complete search history.

(56) References Cited

U.S. PATENT DOCUMENTS

2019/0349964 A1 * 11/2019 Liou ................. H04L 5/001
2020/0119897 A1 *  4/2020 Zhang ............... H04B 7/0413
(Continued)

FOREIGN PATENT DOCUMENTS

WO    2017192889 A1    11/2017

OTHER PUBLICATIONS

PCT International Preliminary Report on Patentability issued in PCT/US2019/053086, dated Apr. 8, 2021; 11 pages.
(Continued)

*Primary Examiner* — Chuong T Ho
(74) *Attorney, Agent, or Firm* — Alliance IP, LLC

(57) ABSTRACT

Systems and methods determine a PUSCH default beam in NR with multiple UE antenna panel operation and multiple TRP operation.

19 Claims, 11 Drawing Sheets

(56) References Cited

U.S. PATENT DOCUMENTS

2021/0045119 A1\* 2/2021 Song .................. H04L 5/003
2022/0132326 A1\* 4/2022 Wang ............... H04W 72/1268

OTHER PUBLICATIONS

Ericsson; "Feature lead summary 2 on beam measurement and reporting," 3GPP TSG RAN WG1 Meeting #92b, R1-1805574; China; Apr. 2018; 29 pages.
Nokia; "Remaining Issues on Beam Management;" 3GPP TSG RAN WG1 Meeting #94, R1-1809237; Sweden; Aug. 2018; 11 pages.
PCT International Search Report and Written Opinion issued in PCT/US2019/053086, dated Jan. 15, 2020; 14 pages.
Qualcomm Incorporated; "Beam Management for NR," 3GPP TSG-RAN WG1 Meeting #94, R1-1809711; Sweden; Aug. 2018; 16 pages.
ZTE; "Enhancements on Multi-Beam Operation," 3GPP TSG RAN WG1 Meeting #94, R1-1808199; Sweden; Aug. 2018; 5 pages.

\* cited by examiner

SYSTEMS, METHODS, AND DEVICES FOR PUSCH DEFAULT BEAM IN MULTI-PANEL OPERATION

CROSS-REFERENCE TO RELATED APPLICATIONS

This application is a national stage application under 35 U.S.C. § 371 of PCT International Application Serial No. PCT/US2019/053086, filed on Sep. 26, 2019, and entitled SYSTEMS, METHODS, AND DEVICES FOR PUSCH DEFAULT BEAM IN MULTI-PANEL OPERATION, which claims the benefit of U.S. Provisional Application No. 62/739,044, filed Sep. 28, 2018 and U.S. Provisional Application No. 62/847,060, filed May 13, 2019, each of which is hereby incorporated by reference herein in its entirety.

TECHNICAL FIELD

This application relates generally to wireless communication systems, and more specifically to determining a physical uplink shared channel (PUSCH) default beam in new radio (NR) with multiple antenna panel operation.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Currently for PUSCH scheduled by downlink control information (DCI) format 0_0, a UE may apply a default spatial relation as the spatial relation used by the physical uplink control channel (PUCCH) resource with the lowest resource identifier (ID). The spatial relation may be for a channel state information reference signal (CSI-RS) resource indicator (CRI), a synchronization signal block (SSB) resource indicator (SSB-RI), and a sounding reference signal (SRS) resource indicator (SRI).

Figure 1:
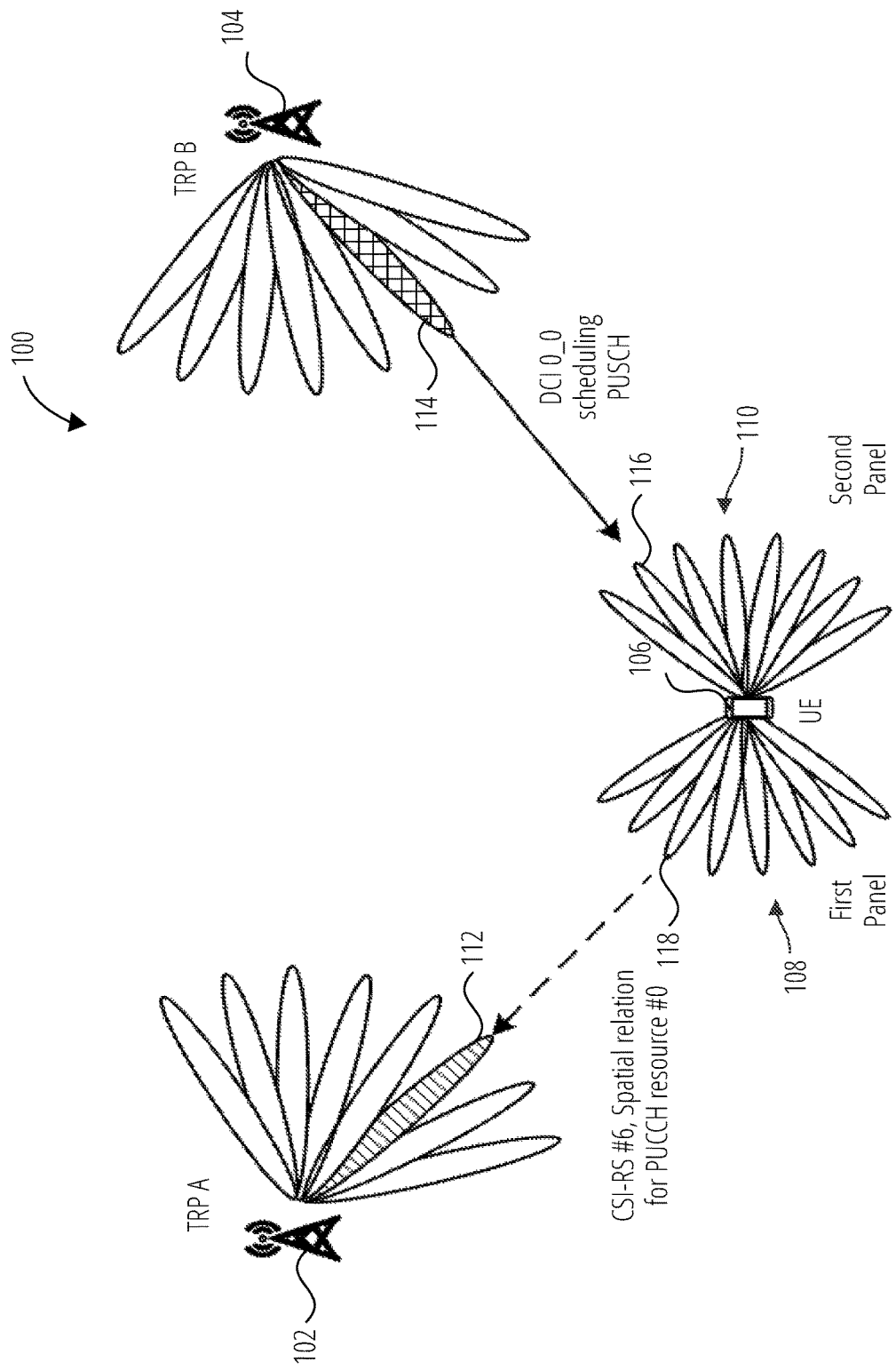
FIG. 1 illustrates an example of multi-TRP multi-panel operation.

However, in the scenario of multiple transmission reception point (TRP) and multiple antenna panel operation, there may be one or more issues with the current scheme for default spatial relation of PUSCH scheduled by DCI format 0_0. For example, FIG. 1 illustrates a multi-TRP multi-panel operation 100 involving a first TRP 102 and a second TRP 104 in communication with a UE 106 comprising a first panel 108 and a second panel 110. In this example, the PUCCH resource with the lowest ID, i.e., PUCCH resource #0, is configured in a spatial relation with CSI-RS #6 which is from the first TRP 102. As shown in FIG. 1, the second TRP 104 may use a beam 114 for a physical downlink control channel (PDCCH) with a DCI having DCI format 0_0 scheduling a PUSCH. The DCI with DCI format 0_0 scheduling the PUSCH is received by a beam 116 corresponding to the second panel 110 of the UE 106. In response to the DCI format 0_0, according to the existing scheme, the PUSCH follows the spatial relation of CSI-RS #6 (corresponding to a beam 116 of the first panel 108 of the UE 106 aligned with a beam 112 of the first TRP 102), which points to the wrong TRP.

Thus, certain embodiments herein configure the PUSCH to follow the spatial relation of one PUCCH from the same TRP or the same UE antenna panel (also referred to herein as UE panel or simply panel). Certain embodiments derive the default spatial relation for PUSCH scheduled by DCI format 0_0 multi-panel operation scenarios involving either multi-TRPs or a single TRP.

Figure 2:
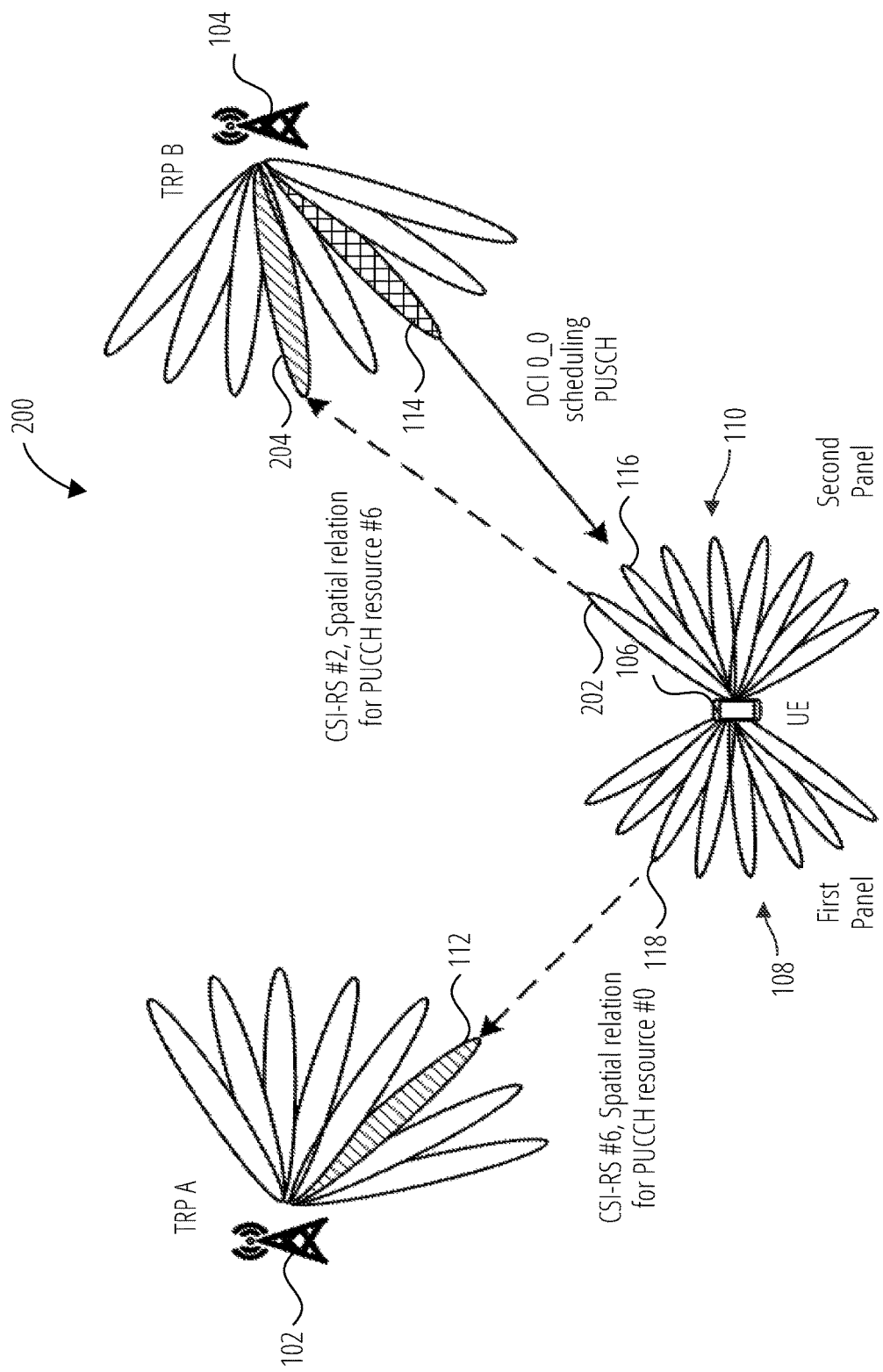
FIG. 2 illustrates a default spatial relation for PUSCH with multi-TRP multi-panel operation in accordance with one embodiment.

A. Default Spatial Relation for PUSCH Scheduled by DCI Format 0_0 with Multi-TRP Multi-Panel Operation For multi-TRP multi-panel operation, certain embodiments provide that the spatial relation of PUSCH follows a specific PUCCH resource which is from the same UE panel or the same TRP. For example, FIG. 2 illustrates a default spatial relation 200 for PUSCH with multi-TRP multi-panel operation in accordance with one embodiment. Similar to the multi-TRP multi-panel operation 100 shown in FIG. 1, the second TRP 104 in the example shown in FIG. 2 uses a beam 114 for DCI format 0_0 scheduling of a PUSCH, which is received by the beam 116 of the second panel 110 of the UE 106. However, rather than using a spatial relation between the beam 112 of the first TRP 102 and the beam 118 of the first panel 108 of the UE 106, the UE 106 in this example determines a default spatial relation that follows one of a specific PUCCH resource, for example, the PUCCH resource with the lowest ID whose spatial relation (CRI, SSB-RI, or SRI) is from the same TRP (second TRP 104) or the same UE antenna panel (second panel 110) corresponding to the DCI format 0_0 scheduling of the PUSCH. In the example shown in FIG. 2, PUCCH resource #6 is the lowest ID among the PUCCH resources whose spatial relation is from second TRP 104. Thus, the PUSCH transmission follows the spatial relation of PUCCH resource #6 (corresponding to a beam 202 of the second panel 110 of the UE 106 and a beam 204 of the second TRP 104).

In one embodiment, when PUSCH is scheduled by DCI format 0_0, the spatial relation of PUSCH follows the one of a specific PUCCH resource, for example, the PUCCH resource with the lowest ID, whose spatial relation is from the same UE panel or the same TRP. For the PUCCH/PUSCH spatial relation, the antenna port group should be introduced. In certain such embodiments, each antenna port group corresponds to one UE antenna panel. When PUSCH is scheduled by DCI format 0_0, the antenna port group of the PUSCH may be indicated by the network to the UE. The default spatial relation of PUSCH follows the one of a specific PUCCH resource with the same antenna port group, for example, the lowest ID within the same antenna group.

Alternatively, each antenna port group for PUCCH spatial relation may be associated with a different TRP or different downlink demodulation reference signal (DMRS) port group. When PUSCH is scheduled by DCI format 0_0, the spatial relation of PUSCH follows the one of a specific PUCCH resource whose antenna port group is associated with the same scheduling TRP or the same downlink DMRS port group as the scheduling PDCCH/DCI.

In certain embodiments, one or more different options can be applied to determine antenna port group of the PUSCH scheduled by DCI format 0_0. For example, one option includes indicating the antenna port group by DCI or higher layer signaling. A predefined antenna port group may also be used. Before radio resource control (RRC) connection, the antenna port group may be the same as what is used to transmit Msg3 (RRC connection request). Another option includes introducing multiple radio network temporary identifiers (RNTIs) for the UE with multi-TRP multi-panel operation, where each RNTI corresponds to one UE panel or one TRP. When scheduling PUSCH by DCI format 0_0, the correct UE panel may be selected according to a different RNTI setting. In another option, the same antenna port group as that which is used to receive scheduling PDCCH may be applied for PUSCH transmission.

In another embodiment, the PUCCH resources are configured into different groups. Each PUCCH group may be associated with different TRP or associated with different PDCCH control resource set (CORESET) group. When PUSCH is scheduled by DCI format 0_0, the spatial relation of PUSCH follows the spatial relation of one specific PUCCH resource in a certain PUCCH resource group, for example, the PUCCH resource with the lowest ID in one PUCCH resource group.

If the PUCCH resource groups are associated with different TRPs, when PUSCH is scheduled by DCI format 0_0, the spatial relation of PUSCH may follow the spatial relation of one specific PUCCH resource in the PUCCH resource group which is associated with the scheduling TRP, for example, the PUCCH resource with the lowest ID in the PUCCH resource group.

If the PUCCH resource group is associated with different PDCCH CORESET group, when PUSCH is scheduled by DCI format 0_0, the spatial relation of PUSCH may follow the spatial relation of one specific PUCCH resource in the PUCCH resource group which is associated with the scheduling PDCCH CORESET, for example, the PUCCH resource with the lowest ID in the PUCCH resource group.

Figure 3:
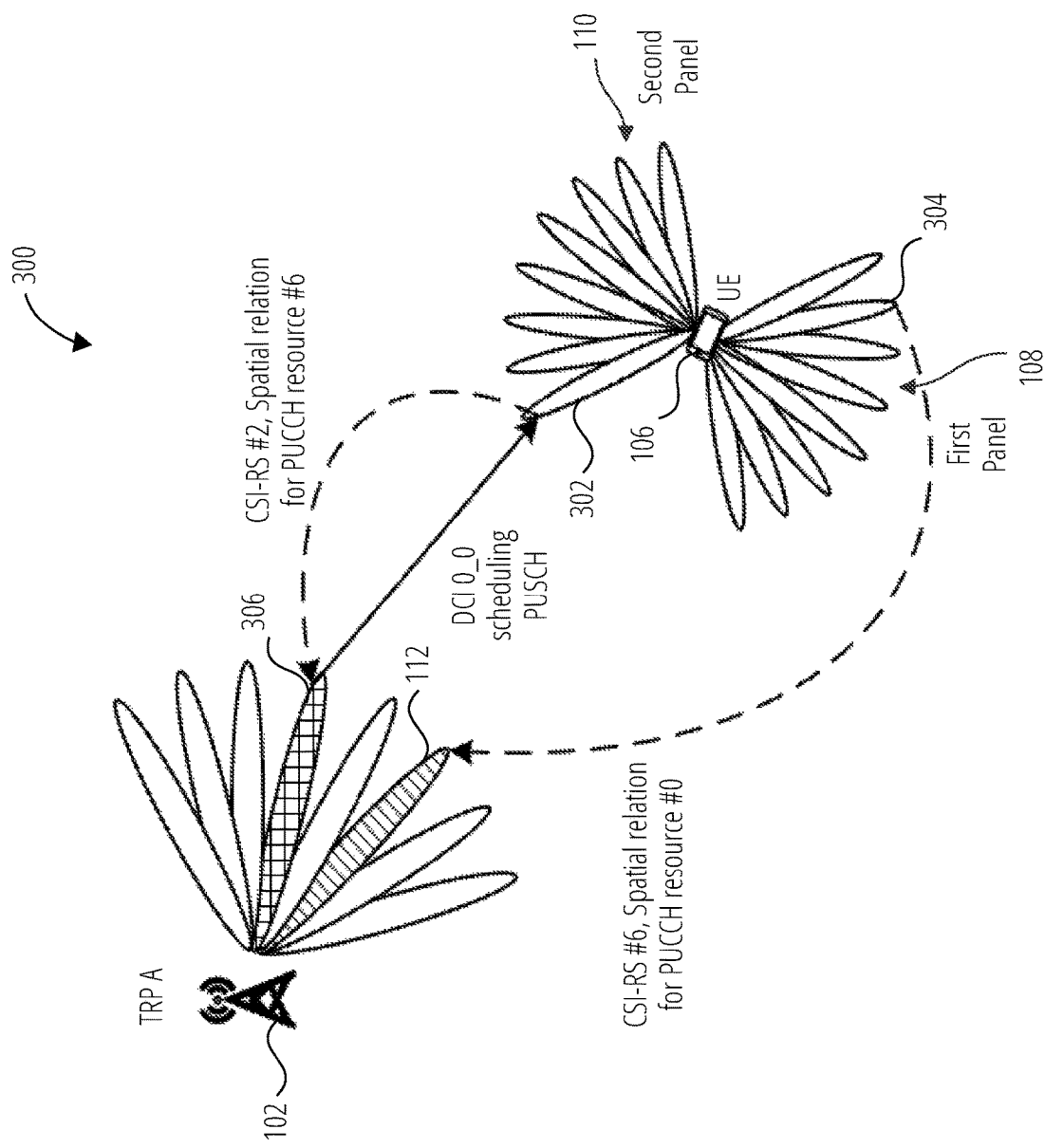
FIG. 3 illustrates a default spatial relation for PUSCH with single-TRP multiple-panel operation in accordance with one embodiment.

B. Default Spatial Relation for PUSCH Scheduled by DCI Format 0_0 with Single TRP Multi-Panel Operation Certain embodiments are directed to single TRP and multiple UE panel operation, as shown in FIG. 3. Such embodiments provide for correct UE panel selection when determining the default spatial relation for PUSCH scheduled by DCI 0_0.

In one embodiment, for the PUCCH/PUSCH spatial relation, the antenna port group is introduced. Each antenna port group may correspond to one UE antenna panel. When PUSCH is scheduled by DCI format 0_0, the antenna port group of the PUSCH may be indicated to the UE by the network. The default spatial relation of PUSCH follows one of a specific PUCCH resource with the same antenna port group, e.g., the PUCCH resource with the lowest ID within the same antenna port group.

Alternatively, when PUSCH is scheduled by DCI 0_0, the UE may firstly select one antenna panel for PUSCH. In certain such embodiments, the selection criteria may be up to implementation. For example, the selection of the antenna panel may be based on the downlink received layer 1 reference signal received power (L1-RSRP). Then, when determining the spatial relation for PUSCH, the spatial relation may follow one of a specific PUCCH resource, e.g., the PUCCH resource with lowest ID whose spatial relation is observed by the same UE antenna panel.

For example, FIG. 3 illustrates a default spatial relation 300 for PUSCH with single-TRP multiple-panel operation in accordance with one embodiment. In this example, the first TRP 102 uses a beam 306 to schedule PUSCH by DCI 0_0, which is received by a beam 302 of the second panel 110 of the UE 106. In response, rather than using CSI-RS #6 spatial relation for PUCCH resource #0 corresponding to a beam 304 of the first panel 108 of the UE 106 and the beam 112 of the first TRP 102, the UE 106 selects the second panel 110 for PUSCH transmission since the downlink L1-RSRP is higher measured by the Rx beam of the second panel 110. Then, the UE 106 selects the PUCCH resource with lowest ID, e.g., PUCCH resource #6 corresponding to CSI-RS #2, whose spatial relation is observed by the UE's second panel 110. The PUSCH transmission follows the spatial relation of PUCCH resource #6 (shown as corresponding to the beam 302 of the UE 106 and the beam 306 of the first TRP 102).

In another embodiment, the panel for PUSCH transmission is selected as the same panel which receives the scheduling PDCCH DCI. The UE panel may be selected according to the transmission configuration indicator (TCI)

state of the scheduling PDCCH. Then, the UE could select the spatial relation of one PUCCH resource with the same panel, e.g., the lowest ID associated with this panel. The PUSCH transmission follows the spatial relation of the selected PUCCH resource.

C. Example Methods

Figure 4:
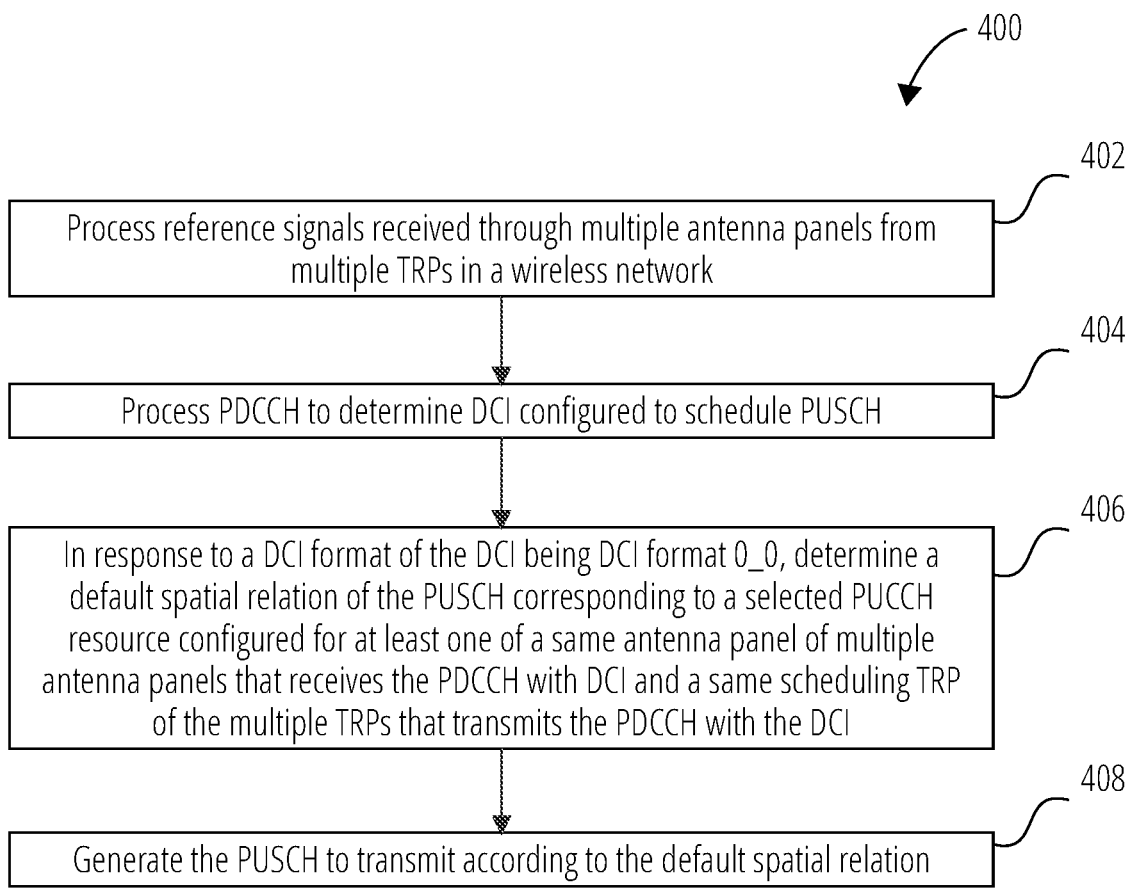
FIG. 4 illustrates a method in accordance with one embodiment.

FIG. 4 is a flowchart illustrating a method 400 for a UE configured for multiple beam operation and including multiple antenna panels. In block 402, the method 400 processes reference signals received through the multiple antenna panels from multiple TRPs in a wireless network. In block 404, the method 400 processes a PDCCH to determine DCI configured to schedule a PUSCH. In block 406, the method 400, in response to a DCI format of the DCI being DCI format 0_0, determines a default spatial relation of the PUSCH corresponding to a selected PUCCH resource configured for at least one of a same antenna panel of the multiple antenna panels that receives the PDCCH with the DCI and a same scheduling TRP of the multiple TRPs that transmits the PDCCH with the DCI. In block 408, the method 400 generates the PUSCH to transmit according to the default spatial relation.

Figure 5:
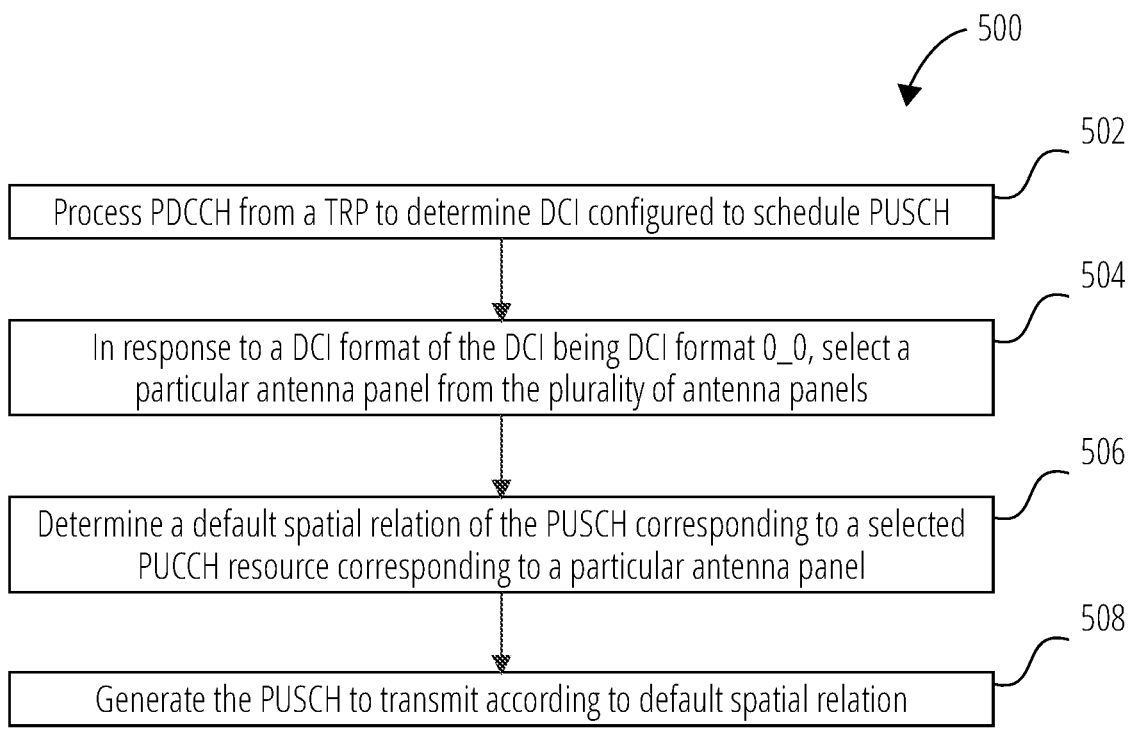
FIG. 5 illustrates a method in accordance with one embodiment.

FIG. 5 is a flowchart of a method 500 for a UE configured for single TRP and multiple antenna panel operation. In block 502, the method 500 processes a PDCCH from a TRP to determine DCI configured to schedule a PUSCH. In block 504, the method 500, in response to a DCI format of the DCI being DCI format 0_0, selects a particular antenna panel from a plurality of antenna panels. In block 506, the method 500 determines a default spatial relation of the PUSCH corresponding to a selected PUCCH resource corresponding to the particular antenna panel. In block 508, the method 500 generates the PUSCH to transmit according to the default spatial relation.

Figure 6:
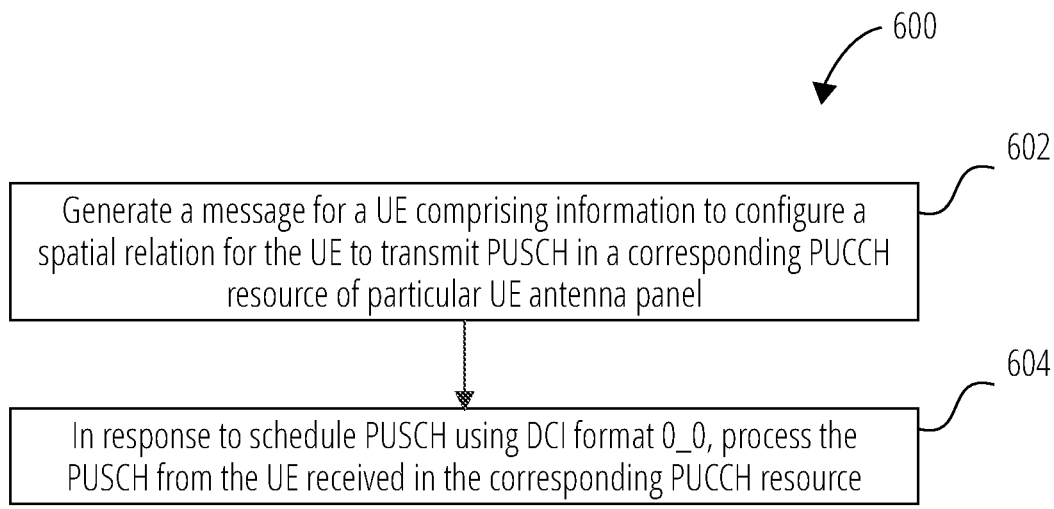
FIG. 6 illustrates a method in accordance with one embodiment.

FIG. 6 is a flowchart illustrating a method 600 for a TRP in a wireless network configured for multi-beam operation. In block 602, the method 600 generates a message for a UE comprising information to configure a spatial relation for the UE to transmit a PUSCH in a corresponding PUCCH resource of a particular UE antenna panel. In block 604, the method 600, in response to scheduling the PUSCH using downlink control information (DCI) format 0_0, processes the PUSCH from the UE received in the corresponding PUCCH resource.

D. Example Systems and Apparatuses

Figure 7:
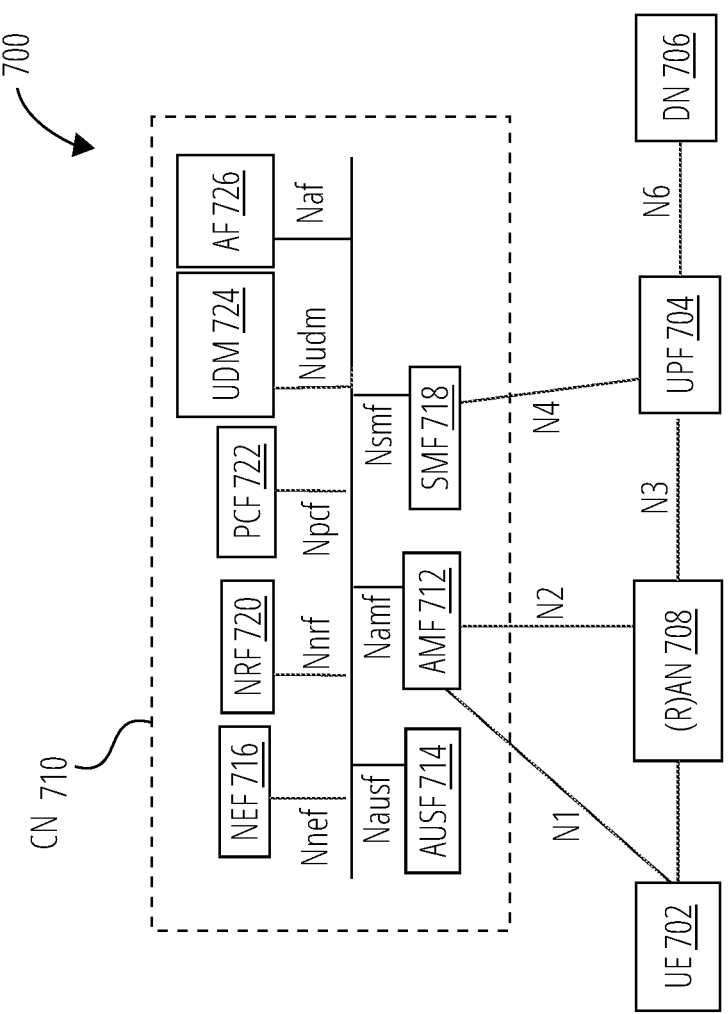
FIG. 7 illustrates a system in accordance with one embodiment.

FIG. 7 illustrates an architecture of a system 700 of a network in accordance with some embodiments. The system 700 is shown to include a UE 702; a 5G access node or RAN node (shown as (R)AN node 708); a User Plane Function (shown as UPF 704); a Data Network (DN 706), which may be, for example, operator services, Internet access or 3rd party services; and a 5G Core Network (5GC) (shown as CN 710).

The CN 710 may include an Authentication Server Function (AUSF 714); a Core Access and Mobility Management Function (AMF 712); a Session Management Function (SMF 718); a Network Exposure Function (NEF 716); a Policy Control Function (PCF 722); a Network Function (NF) Repository Function (NRF 720); a Unified Data Management (UDM 724); and an Application Function (AF 726). The CN 710 may also include other elements that are not shown, such as a Structured Data Storage network function (SDSF), an Unstructured Data Storage network function (UDSF), and the like.

The UPF 704 may act as an anchor point for intra-RAT and inter-RAT mobility, an external PDU session point of interconnect to DN 706, and a branching point to support multi-homed PDU session. The UPF 704 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 704 may include an uplink classifier to support routing traffic flows to a data network. The DN 706 may represent various network operator services, Internet access, or third party services.

The AUSF 714 may store data for authentication of UE 702 and handle authentication related functionality. The AUSF 714 may facilitate a common authentication framework for various access types.

The AMF 712 may be responsible for registration management (e.g., for registering UE 702, etc.), connection management, reachability management, mobility management, and lawful interception of AMF-related events, and access authentication and authorization. AMF 712 may provide transport for SM messages for the SMF 718, and act as a transparent proxy for routing SM messages. AMF 712 may also provide transport for short message service (SMS) messages between UE 702 and an SMS function (SMSF) (not shown by FIG. 7). AMF 712 may act as Security Anchor Function (SEA), which may include interaction with the AUSF 714 and the UE 702, receipt of an intermediate key that was established as a result of the UE 702 authentication process. Where USIM based authentication is used, the AMF 712 may retrieve the security material from the AUSF 714. AMF 712 may also include a Security Context Management (SCM) function, which receives a key from the SEA that it uses to derive access-network specific keys. Furthermore, AMF 712 may be a termination point of RAN CP interface (N2 reference point), a termination point of NAS (NI) signaling, and perform NAS ciphering and integrity protection.

AMF 712 may also support NAS signaling with a UE 702 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 702 and AMF 712, and relay uplink and downlink user-plane packets between the UE 702 and UPF 704. The N3IWF also provides mechanisms for IPsec tunnel establishment with the UE 702.

The SMF 718 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS;

lawful intercept (for SM events and interface to LI System); termination of SM parts of NAS messages; downlink Data Notification; initiator of AN specific SM information, sent via AMF over N2 to AN; determine SSC mode of a session. The SMF 718 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 716 may provide means for securely exposing the services and capabilities provided by 3GPP network functions for third party, internal exposure/re-exposure, Application Functions (e.g., AF 726), edge computing or fog computing systems, etc. In such embodiments, the NEF 716 may authenticate, authorize, and/or throttle the AFs. NEF 716 may also translate information exchanged with the AF 726 and information exchanged with internal network functions. For example, the NEF 716 may translate between an AF-Service-Identifier and an internal 5GC information. NEF 716 may also receive information from other network functions (NFs) based on exposed capabilities of other network functions. This information may be stored at the NEF 716 as structured data, or at a data storage NF using a standardized interfaces. The stored information can then be re-exposed by the NEF 716 to other NFs and AFs, and/or used for other purposes such as analytics.

The NRF 720 may support service discovery functions, receive NF Discovery Requests from NF instances, and provide the information of the discovered NF instances to the NF instances. NRF 720 also maintains information of available NF instances and their supported services.

The PCF 722 may provide policy rules to control plane function(s) to enforce them, and may also support unified policy framework to govern network behavior. The PCF 722 may also implement a front end (FE) to access subscription information relevant for policy decisions in a UDR of UDM 724.

The UDM 724 may handle subscription-related information to support the network entities' handling of communication sessions, and may store subscription data of UE 702. The UDM 724 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 722. UDM 724 may also support SMS management, wherein an SMS-FE implements the similar application logic as discussed previously.

The AF 726 may provide application influence on traffic routing, access to the Network Capability Exposure (NCE), and interact with the policy framework for policy control. The NCE may be a mechanism that allows the 5GC and AF 726 to provide information to each other via NEF 716, which may be used for edge computing implementations. In such implementations, the network operator and third party services may be hosted close to the UE 702 access point of attachment to achieve an efficient service delivery through the reduced end-to-end latency and load on the transport network. For edge computing implementations, the 5GC may select a UPF 704 close to the UE 702 and execute traffic steering from the UPF 704 to DN 706 via the N6 interface. This may be based on the UE subscription data, UE location, and information provided by the AF 726. In this way, the AF 726 may influence UPF (re)selection and traffic routing. Based on operator deployment, when AF 726 is considered to be a trusted entity, the network operator may permit AF 726 to interact directly with relevant NFs.

As discussed previously, the CN 710 may include an SMSF, which may be responsible for SMS subscription checking and verification, and relaying SM messages to/from the UE 702 to/from other entities, such as an SMS-GMSC/IWMSC/SMS-router. The SMS may also interact with AMF 712 and UDM 724 for notification procedure that the UE 702 is available for SMS transfer (e.g., set a UE not reachable flag, and notifying UDM 724 when UE 702 is available for SMS).

The system 700 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 700 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 710 may include an Nx interface, which is an inter-CN interface between an MME and the AMF 712 in order to enable interworking between CN 710 and other core networks.

Although not shown by FIG. 7, the system 700 may include multiple RAN nodes (such as (R)AN node 708) wherein an Xn interface is defined between two or more (R)AN node 708 (e.g., gNBs and the like) that connecting to 5GC 410, between a (R)AN node 708 (e.g., gNB) connecting to CN 710 and an eNB, and/or between two eNBs connecting to CN 710.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 702 in a connected mode (e.g., CM-CONNECTED) including functionality to manage the UE mobility for connected mode between one or more (R)AN node 708. The mobility support may include context transfer from an old (source) serving (R)AN node 708 to new (target) serving (R)AN node 708; and control of user plane tunnels between old (source) serving (R)AN node 708 to new (target) serving (R)AN node 708.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
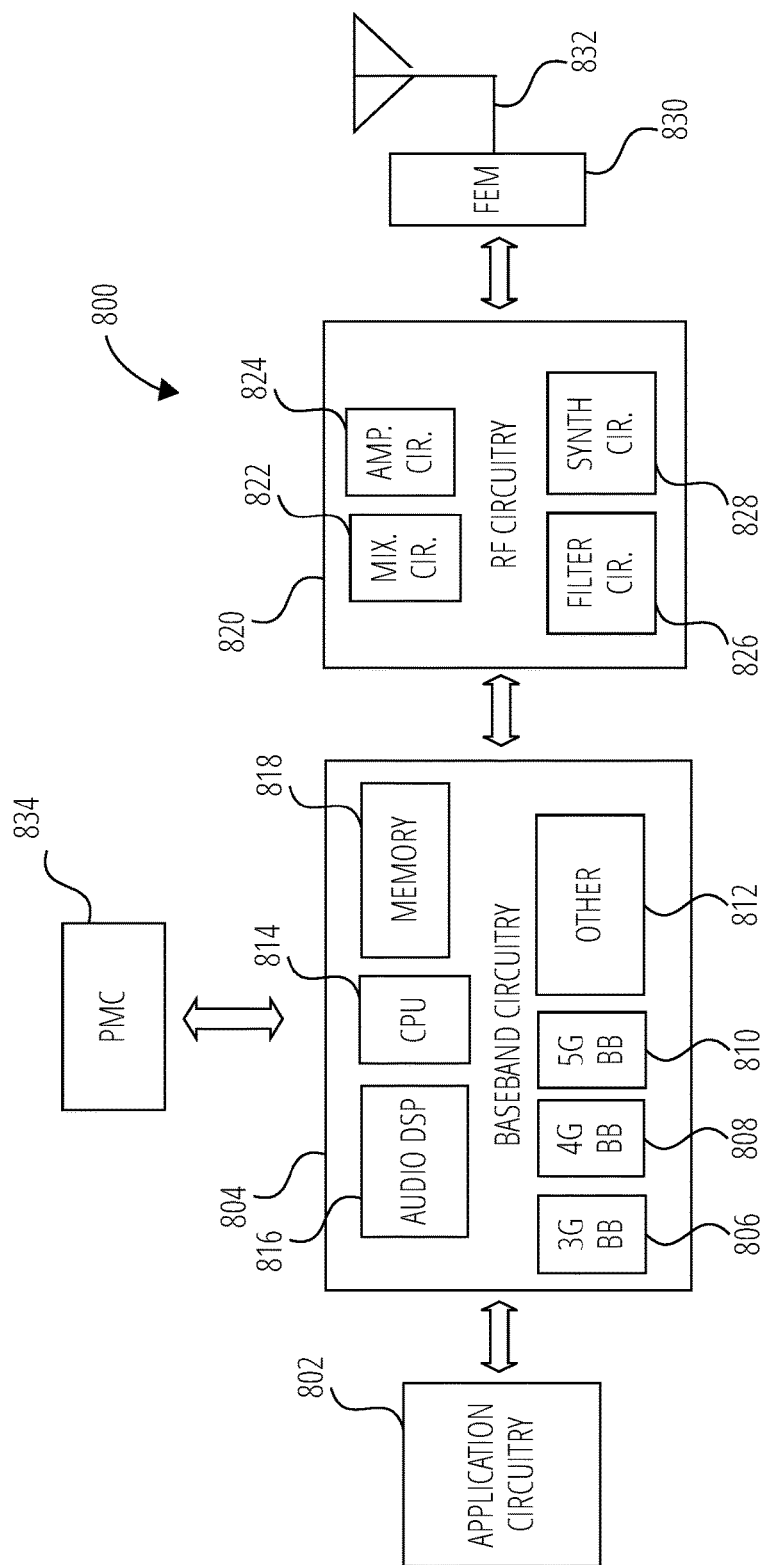
FIG. 8 illustrates a device in accordance with one embodiment.

FIG. 8 illustrates example components of a device 800 in accordance with some embodiments. In some embodiments, the device 800 may include application circuitry 802, baseband circuitry 804, Radio Frequency (RF) circuitry (shown as RF circuitry 820), front-end module (FEM) circuitry (shown as FEM circuitry 830), one or more antennas 832, and power management circuitry (PMC) (shown as PMC 834) coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 820 and to generate baseband signals for a transmit signal path of the RF circuitry 820. The baseband circuitry 804 may interface with the application circuitry 802 for generation and processing of the baseband signals and for controlling operations of the RF circuitry 820. For example, in some embodiments, the baseband circuitry 804 may include a third generation (3G) baseband processor (3G baseband processor 806), a fourth generation (4G) baseband processor (4G baseband processor 808), a fifth generation (5G) baseband processor (5G baseband processor 810), or other baseband processor(s) 812 for other existing generations, generations in development or to be developed in the future (e.g., second generation (2G), sixth generation (6G), etc.). The baseband circuitry 804 (e.g., one or more of baseband processors) may handle various radio control functions that enable communication with one or more radio networks via the RF circuitry 820. In other embodiments, some or all of the functionality of the illustrated baseband processors may be included in modules stored in the memory 818 and executed via a Central Processing Unit (CPU 814). The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include a digital signal processor (DSP), such as one or more audio DSP(s) 816. The one or more audio DSP(s) 816 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 820 may enable communication with wireless networks using modulated electromagnetic radiation through a non-solid medium. In various embodiments, the RF circuitry 820 may include switches, filters, amplifiers, etc. to facilitate the communication with the wireless network. The RF circuitry 820 may include a receive signal path which may include circuitry to down-convert RF signals received from the FEM circuitry 830 and provide baseband signals to the baseband circuitry 804. The RF circuitry 820 may also include a transmit signal path which may include circuitry to up-convert baseband signals provided by the baseband circuitry 804 and provide RF output signals to the FEM circuitry 830 for transmission.

In some embodiments, the receive signal path of the RF circuitry 820 may include mixer circuitry 822, amplifier circuitry 824 and filter circuitry 826. In some embodiments, the transmit signal path of the RF circuitry 820 may include filter circuitry 826 and mixer circuitry 822. The RF circuitry 820 may also include synthesizer circuitry 828 for synthesizing a frequency for use by the mixer circuitry 822 of the receive signal path and the transmit signal path. In some embodiments, the mixer circuitry 822 of the receive signal path may be configured to down-convert RF signals received from the FEM circuitry 830 based on the synthesized frequency provided by synthesizer circuitry 828. The amplifier circuitry 824 may be configured to amplify the down-converted signals and the filter circuitry 826 may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 822 of the receive signal path may comprise passive mixers, although the scope of the embodiments is not limited in this respect.

In some embodiments, the mixer circuitry 822 of the transmit signal path may be configured to up-convert input baseband signals based on the synthesized frequency provided by the synthesizer circuitry 828 to generate RF output signals for the FEM circuitry 830. The baseband signals may be provided by the baseband circuitry 804 and may be filtered by the filter circuitry 826.

In some embodiments, the mixer circuitry 822 of the receive signal path and the mixer circuitry 822 of the transmit signal path may include two or more mixers and may be arranged for quadrature downconversion and upconversion, respectively. In some embodiments, the mixer circuitry 822 of the receive signal path and the mixer circuitry 822 of the transmit signal path may include two or more mixers and may be arranged for image rejection (e.g., Hartley image rejection). In some embodiments, the mixer circuitry 822 of the receive signal path and the mixer circuitry 822 may be arranged for direct downconversion and direct upconversion, respectively. In some embodiments, the mixer circuitry 822 of the receive signal path and the mixer circuitry 822 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 820 may include analog-to-digital converter (ADC) and digital-to-analog converter (DAC) circuitry and the baseband circuitry 804 may include a digital baseband interface to communicate with the RF circuitry 820.

In some dual-mode embodiments, a separate radio IC circuitry may be provided for processing signals for each spectrum, although the scope of the embodiments is not limited in this respect.

In some embodiments, the synthesizer circuitry 828 may be a fractional-N synthesizer or a fractional N/N+1 synthesizer, although the scope of the embodiments is not limited in this respect as other types of frequency synthesizers may be suitable. For example, synthesizer circuitry 828 may be a delta-sigma synthesizer, a frequency multiplier, or a synthesizer comprising a phase-locked loop with a frequency divider.

The synthesizer circuitry 828 may be configured to synthesize an output frequency for use by the mixer circuitry 822 of the RF circuitry 820 based on a frequency input and a divider control input. In some embodiments, the synthesizer circuitry 828 may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 828 of the RF circuitry 820 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 828 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 820 may include an IQ/polar converter.

The FEM circuitry 830 may include a receive signal path which may include circuitry configured to operate on RF signals received from one or more antennas 832, amplify the received signals and provide the amplified versions of the received signals to the RF circuitry 820 for further processing. The FEM circuitry 830 may also include a transmit signal path which may include circuitry configured to amplify signals for transmission provided by the RF circuitry 820 for transmission by one or more of the one or more antennas 832. In various embodiments, the amplification through the transmit or receive signal paths may be done solely in the RF circuitry 820, solely in the FEM circuitry 830, or in both the RF circuitry 820 and the FEM circuitry 830.

In some embodiments, the FEM circuitry 830 may include a TX/RX switch to switch between transmit mode and receive mode operation. The FEM circuitry 830 may include a receive signal path and a transmit signal path. The receive signal path of the FEM circuitry 830 may include an LNA to amplify received RF signals and provide the amplified received RF signals as an output (e.g., to the RF circuitry 820). The transmit signal path of the FEM circuitry 830 may include a power amplifier (PA) to amplify input RF signals (e.g., provided by the RF circuitry 820), and one or more filters to generate RF signals for subsequent transmission (e.g., by one or more of the one or more antennas 832).

In some embodiments, the PMC 834 may manage power provided to the baseband circuitry 804. In particular, the PMC 834 may control power-source selection, voltage scaling, battery charging, or DC-to-DC conversion. The PMC 834 may often be included when the device 800 is capable of being powered by a battery, for example, when the device 800 is included in a UE. The PMC 834 may increase the power conversion efficiency while providing desirable implementation size and heat dissipation characteristics.

FIG. 8 shows the PMC 834 coupled only with the baseband circuitry 804. However, in other embodiments, the PMC 834 may be additionally or alternatively coupled with, and perform similar power management operations for, other components such as, but not limited to, the application circuitry 802, the RF circuitry 820, or the FEM circuitry 830.

In some embodiments, the PMC 834 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
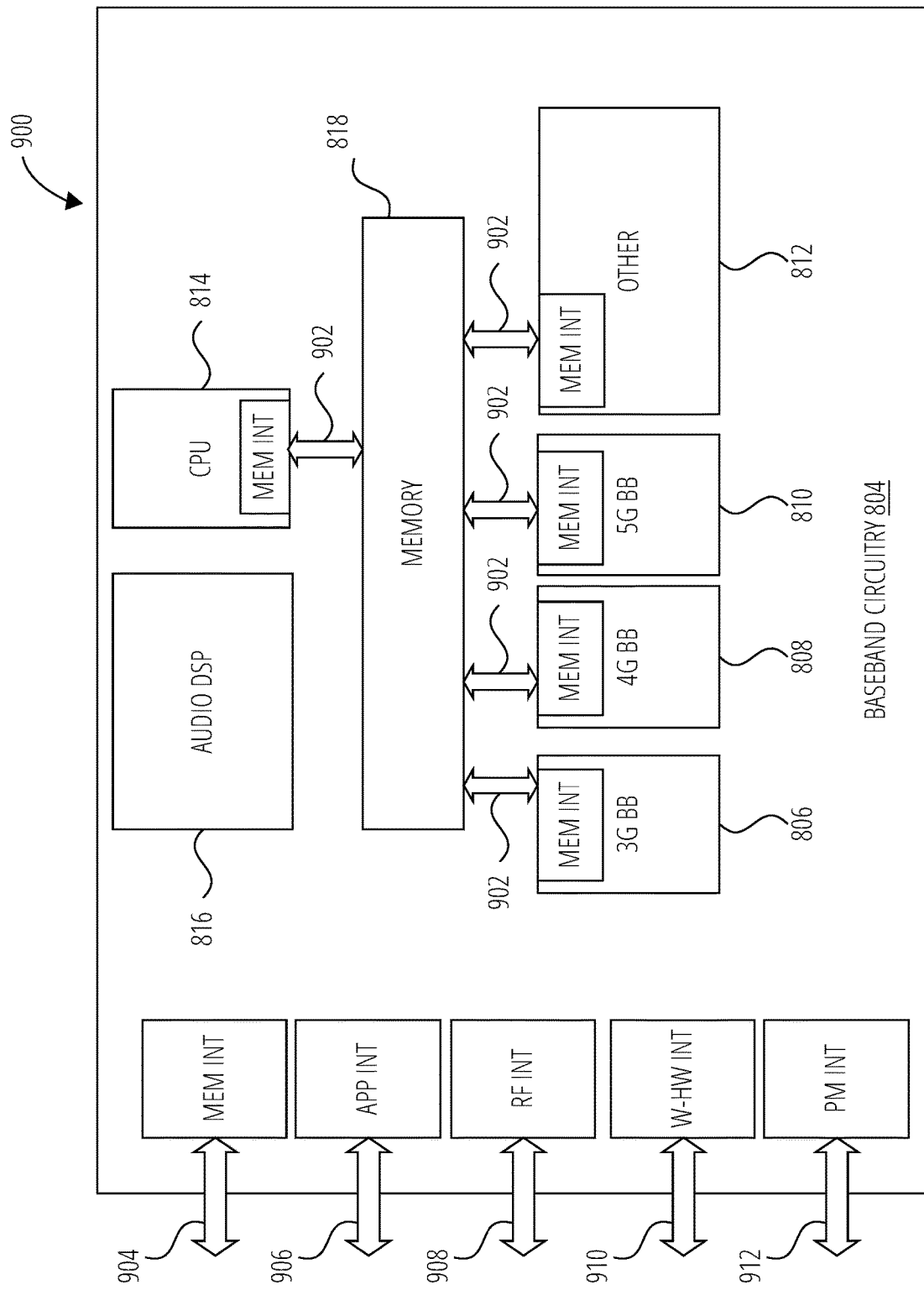
FIG. 9 illustrates an example interfaces in accordance with one embodiment.

FIG. 9 illustrates example interfaces 900 of baseband circuitry in accordance with some embodiments. As discussed above, the baseband circuitry 804 of FIG. 8 may comprise 3G baseband processor 806, 4G baseband processor 808, 5G baseband processor 810, other baseband processor(s) 812, CPU 814, and a memory 818 utilized by said processors. As illustrated, each of the processors may include a respective memory interface 902 to send/receive data to/from the memory 818.

The baseband circuitry 804 may further include one or more interfaces to communicatively couple to other circuitries/devices, such as a memory interface 904 (e.g., an interface to send/receive data to/from memory external to the baseband circuitry 804), an application circuitry interface 906 (e.g., an interface to send/receive data to/from the application circuitry 802 of FIG. 8), an RF circuitry interface 908 (e.g., an interface to send/receive data to/from RF circuitry 820 of FIG. 8), a wireless hardware connectivity interface 910 (e.g., an interface to send/receive data to/from Near Field Communication (NFC) components, Bluetooth® components (e.g., Bluetooth® Low Energy), Wi-Fi® components, and other communication components), and a power management interface 912 (e.g., an interface to send/receive power or control signals to/from the PMC 834.

Figure 10:
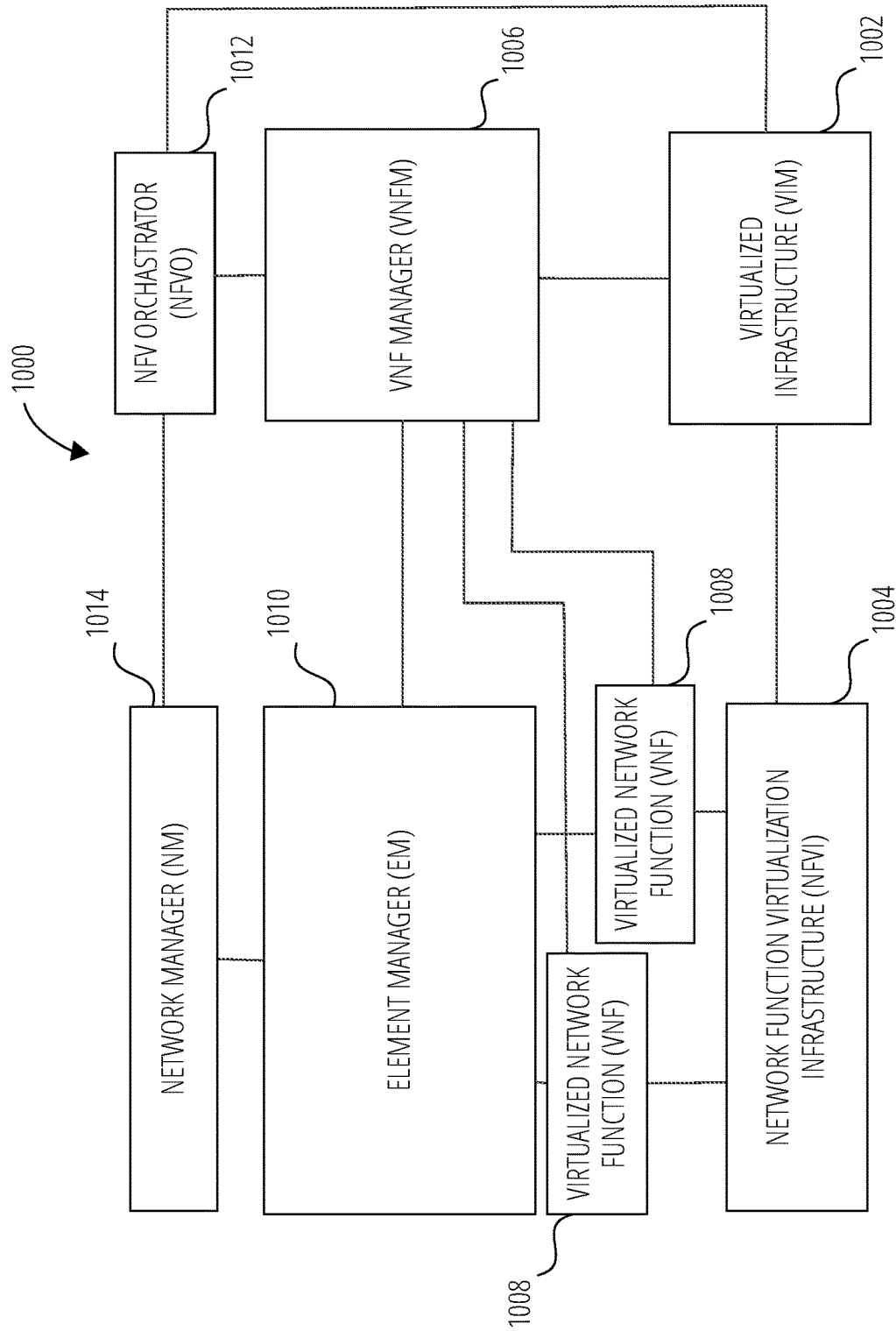
FIG. 10 illustrates a system in accordance with one embodiment.

FIG. 10 is a block diagram illustrating components, according to some example embodiments, of a system 1000 to support NFV. The system 1000 is illustrated as including a virtualized infrastructure manager (shown as VIM 1002), a network function virtualization infrastructure (shown as NFVI 1004), a VNF manager (shown as VNFM 1006), virtualized network functions (shown as VNF 1008), an element manager (shown as EM 1010), an NFV Orchestrator (shown as NFVO 1012), and a network manager (shown as NM 1014).

The VIM 1002 manages the resources of the NFVI 1004. The NFVI 1004 can include physical or virtual resources and applications (including hypervisors) used to execute the system 1000. The VIM 1002 may manage the life cycle of virtual resources with the NFVI 1004 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1006 may manage the VNF 1008. The VNF 1008 may be used to execute EPC components/functions. The VNFM 1006 may manage the life cycle of the VNF 1008 and track performance, fault and security of the virtual aspects of VNF 1008. The EM 1010 may track the performance, fault and security of the functional aspects of VNF 1008. The tracking data from the VNFM 1006 and the EM 1010 may comprise, for example, performance measurement (PM) data used by the VIM 1002 or the NFVI 1004. Both the VNFM 1006 and the EM 1010 can scale up/down the quantity of VNFs of the system 1000.

The NFVO 1012 may coordinate, authorize, release and engage resources of the NFVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur via the EM 1010).

Figure 11:
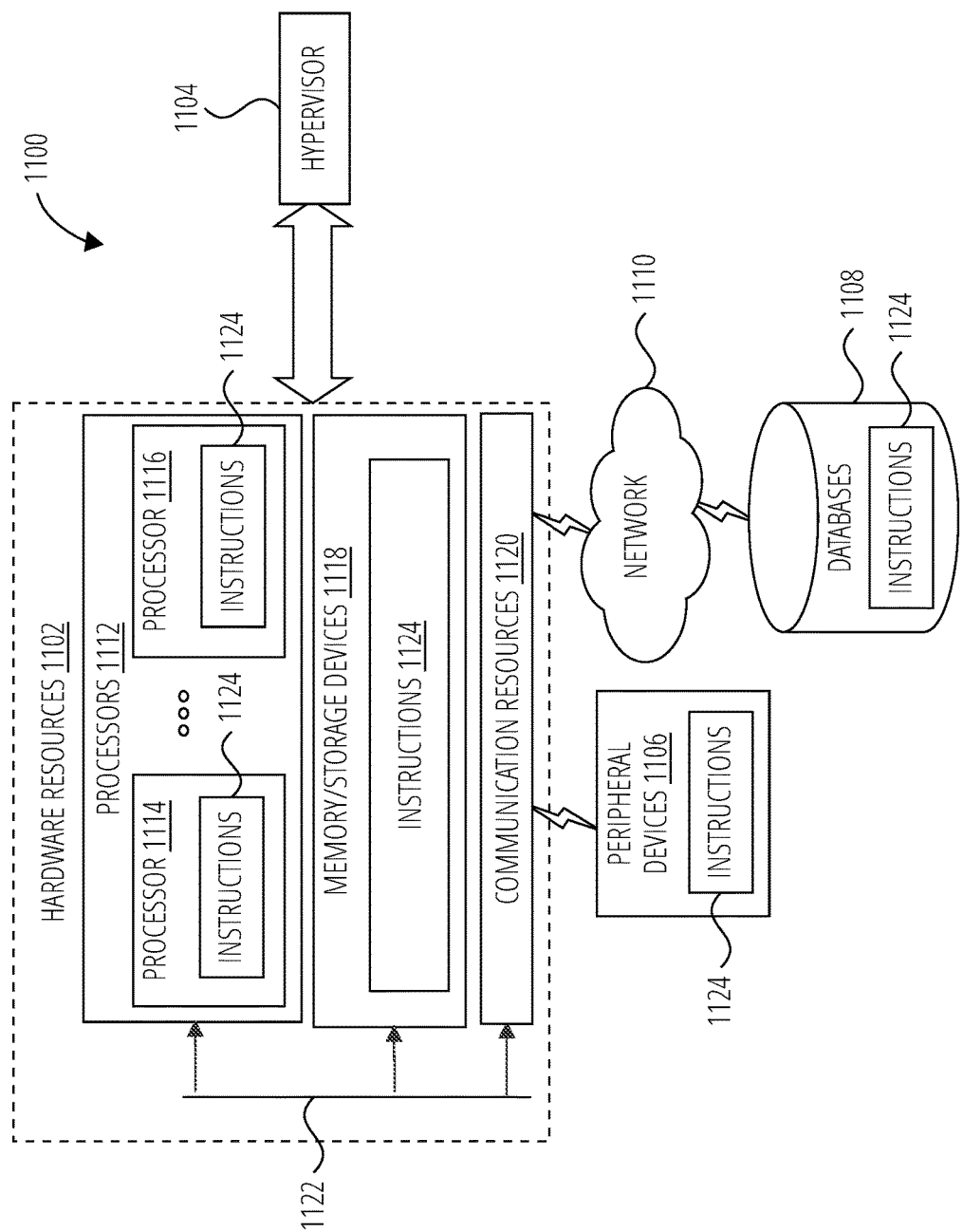
FIG. 11 illustrates components in accordance with one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may comprise software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

E. Example Section

The following examples pertain to further embodiments.

Example 1 is an apparatus for a user equipment (UE) configured for multiple beam operation and including multiple antenna panels. The apparatus includes a memory interface and a processor. The memory interface to send or receive, to or from a memory device, downlink control information (DCI). The processor to: process reference signals received through the multiple antenna panels from multiple transmission reception points (TRPs) in a wireless network; process a physical downlink control channel (PDCCH) to determine the DCI configured to schedule a physical uplink shared channel (PUSCH); in response to a DCI format of the DCI being DCI format 0_0, determine a default spatial relation of the PUSCH corresponding to a selected physical uplink control channel (PUCCH) resource configured for at least one of a same antenna panel of the multiple antenna panels that receives the PDCCH with the DCI and a same scheduling TRP of the multiple TRPs that transmits the PDCCH with the DCI; and generate the PUSCH to transmit according to the default spatial relation.

Example 2 is the apparatus of Example 1, wherein the selected PUCCH resource comprises a lowest resource identifier (ID) within at least one of the same antenna panel and the same scheduling TRP.

Example 3 is the apparatus of Example 1, wherein each of the multiple antenna panels corresponds to a respective antenna port group, the processor further configured to determine a particular antenna port group of the PUSCH indicated by the wireless network, the selected PUCCH resource corresponding to the particular antenna port group.

Example 4 is the apparatus of Example 3, wherein the selected PUCCH resource comprises a lowest resource identifier (ID) within the particular antenna port group.

Example 5 is the apparatus of Example 3, wherein the particular antenna port group corresponds to the same antenna panel that receives the PDCCH with the DCI.

Example 6 is the apparatus of Example 3, wherein the particular antenna port group is associated with at least one of the same scheduling TRP and a same demodulation reference signal (DMRS) port group corresponding to the PDCCH with the DCI.

Example 7 is the apparatus of Example 3, wherein to determine the particular antenna port group is based on at least one of an indication in the DCI, higher layer signal, and a predefined value.

Example 8 is the apparatus of Example 3, wherein multiple radio network temporary identifiers (RNTIs) are provided for the UE configured for multiple beam operation, each RNTI corresponding to one UE antenna panel or one TRP, wherein determining the particular antenna port group is based on an indicated RNTI setting.

Example 9 is the apparatus of Example 1, wherein a plurality of PUCCH resources are configured into different PUCCH resource groups, wherein each PUCCH resource group is associated with a different TRP or a different PDCCH control resource set (CORESET) group, the processor further configured to determine a particular PUCCH resource group from among the different PUCCH resource groups, the selected PUCCH resource being within the particular PUCCH resource group.

Example 10 is the apparatus of Example 9, wherein the selected PUCCH resource comprises a lowest resource identifier (ID) within the particular PUCCH resource group.

Example 11 is the apparatus of Example 9, wherein if each PUCCH resource group is associated with a different TRP, the particular PUCCH resource group is associated with the same scheduling TRP that transmits the PDCCH with the DCI; and wherein if each PUCCH resource group is associated with a different PDCCH CORESET group, the particular PUCCH resource group is associated with a scheduling PDCCH CORESET corresponding to the PDCCH with the DCI.

Example 12 is a non-transitory computer-readable storage medium. The computer-readable storage medium including instructions that when executed by a processor of a user equipment (UE) configured for single transmission reception point (TRP) and multiple antenna panel operation, cause the processor to: process a physical downlink control channel (PDCCH) from a TRP to determine downlink control information (DCI) configured to schedule a physical uplink shared channel (PUSCH); in response to a DCI format of the DCI being DCI format 0_0, select a particular antenna panel from a plurality of antenna panels; determine a default spatial relation of the PUSCH corresponding to a selected physical uplink control channel (PUCCH) resource corresponding to the particular antenna panel; and generate the PUSCH to transmit according to the default spatial relation.

Example 13 is the computer-readable storage medium of Example 12, wherein each of the plurality of antenna panels corresponds to a respective antenna port group, the instructions further to configure the processor to determine a particular antenna port group of the PUSCH indicated by the wireless network, the selected PUCCH resource corresponding to the particular antenna port group.

Example 14 is the computer-readable storage medium of Example 13, wherein the selected PUCCH resource comprises a lowest resource identifier (ID) within the particular antenna port group.

Example 15 is the computer-readable storage medium of Example 12, wherein the instructions further configure the processor to: determine a downlink received layer 1 reference signal received power (L1-RSRP) value for each of the plurality of antenna panels; select the particular antenna panel based on a highest of the downlink received L1-RSRP values; and determine the selected PUCCH resource based on a lowest resource identifier (ID) with the particular antenna panel.

Example 16 is the computer-readable storage medium of Example 12, wherein the instructions further configure the processor to: select the particular antenna panel as a same antenna panel that receives the PDCCH with the DCI; and determine the selected PUCCH resource based on a lowest resource identifier (ID) with the particular antenna panel.

Example 17 is the computer-readable storage medium of Example 16, wherein the instructions further configure the processor to select the particular antenna panel based at least in part on a transmission configuration indicator (TCI) state of the PDCCH configured to schedule the PUSCH.

Example 18 is a method for a transmission reception point (TRP) in a wireless network configured for multi-beam operation. The method includes: generating a message for a user equipment (UE) comprising information to configure a spatial relation for the UE to transmit a physical uplink shared channel (PUSCH) in a corresponding physical uplink control channel (PUCCH) resource of a particular UE antenna panel; in response to scheduling the PUSCH using downlink control information (DCI) format 0_0, processing the PUSCH from the UE received in the corresponding PUCCH resource.

Example 19 is the method of Example 18, wherein the spatial relation is for one of a channel state information reference signal (CSI-RS) resource indicator (CRI), a synchronization signal block (SSB) resource indicator (SSB-RI), and a sounding reference signal (SRS) resource indicator (SRI).

Example 20 is the method of Example 18, wherein the message comprising the information to configure the spatial relation comprises a physical downlink control channel (PDCCH) including downlink control information (DCI) configured to schedule the PUSCH.

Example 21 is the method of Example 18, wherein the information to configure the spatial relation indicates the particular antenna panel.

Example 22 is the method of Example 18, wherein the information to configure the spatial relation indicates an antenna port group corresponding to the particular antenna port panel.

Example 23 is the method of Example 18, wherein the information to configure the spatial relation indicates a physical downlink control channel (PDCCH) control resource set (CORESET) group.

Example 24 is the method of Example 18, wherein the information to configure the spatial relation indicates a radio network temporary identifier (RNTI) setting.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE) configured for multiple beam operation and including multiple antenna panels, each of the multiple antenna panels corresponding to a respective antenna port group, the apparatus comprising:
  a memory interface to send or receive, to or from a memory device, downlink control information (DCI); and
  a processor to:
    process reference signals received through the multiple antenna panels from multiple transmission reception points (TRPs) in a wireless network;
    process a physical downlink control channel (PDCCH) to determine the DCI configured to schedule a physical uplink shared channel (PUSCH);
    in response to a DCI format of the DCI being DCI format 0_0:
      determine a default spatial relation of the PUSCH corresponding to a selected physical uplink control channel (PUCCH) resource configured for at least one of a same antenna panel of the multiple antenna panels that receives the PDCCH with the DCI and a same scheduling TRP of the multiple TRPs that transmits the PDCCH with the DCI; and
determine a particular antenna port group of the PUSCH, the selected PUCCH resource corresponding to the particular antenna port group; and
generate the PUSCH to transmit according to the default spatial relation.

2. The apparatus of claim 1, wherein the selected PUCCH resource comprises a lowest resource identifier (ID) within at least one of the same antenna panel and the same scheduling TRP.

3. The apparatus of claim 1, wherein the selected PUCCH resource comprises a lowest resource identifier (ID) within the particular antenna port group.

4. The apparatus of claim 1, wherein the particular antenna port group corresponds to the same antenna panel that receives the PDCCH with the DCI.

5. The apparatus of claim 1, wherein the particular antenna port group is associated with at least one of the same scheduling TRP and a same demodulation reference signal (DMRS) port group corresponding to the PDCCH with the DCI.

6. The apparatus of claim 1, wherein to determine the particular antenna port group is based on at least one of an indication in the DCI, higher layer signal, and a predefined value.

7. The apparatus of claim 1, wherein multiple radio network temporary identifiers (RNTIs) are provided for the UE configured for multiple beam operation, each RNTI corresponding to one UE antenna panel or one TRP, wherein determining the particular antenna port group is based on an indicated RNTI setting.

8. The apparatus of claim 1, wherein a plurality of PUCCH resources are configured into different PUCCH resource groups, wherein each PUCCH resource group is associated with a different TRP or a different PDCCH control resource set (CORESET) group, the processor further configured to determine a particular PUCCH resource group from among the different PUCCH resource groups, the selected PUCCH resource being within the particular PUCCH resource group.

9. The apparatus of claim 8, wherein the selected PUCCH resource comprises a lowest resource identifier (ID) within the particular PUCCH resource group.

10. The apparatus of claim 8, wherein if each PUCCH resource group is associated with a different TRP, the particular PUCCH resource group is associated with the same scheduling TRP that transmits the PDCCH with the DCI; and
wherein if each PUCCH resource group is associated with a different PDCCH CORESET group, the particular PUCCH resource group is associated with a scheduling PDCCH CORESET corresponding to the PDCCH with the DCI.

11. The apparatus of claim 1, further including the multiple antenna panels coupled to the processor to transmit and receive signals.

12. A non-transitory computer-readable storage medium, the computer-readable storage medium including instructions that when executed by a processor of a user equipment (UE) configured for single transmission reception point (TRP) and multiple antenna panel operation in a wireless network, cause the processor to:
process a physical downlink control channel (PDCCH) from a TRP to determine downlink control information (DCI) configured to schedule a physical uplink shared channel (PUSCH);

in response to a DCI format of the DCI being DCI format 0_0, select a particular antenna panel from a plurality of antenna panels;
determine a default spatial relation of the PUSCH corresponding to a selected physical uplink control channel (PUCCH) resource corresponding to the particular antenna panel, wherein each of the plurality of antenna panels corresponds to a respective antenna port group, the instructions further to configure the processor to determine a particular antenna port group of the PUSCH, the selected PUCCH resource corresponding to the particular antenna port group; and
generate the PUSCH to transmit according to the default spatial relation.

13. The non-transitory computer-readable storage medium of claim 12, wherein the selected PUCCH resource comprises a lowest resource identifier (ID) within the particular antenna port group.

14. The non-transitory computer-readable storage medium of claim 12, wherein the instructions further configure the processor to:
determine a downlink received layer 1 reference signal received power (L1-RSRP) value for each of the plurality of antenna panels;
select the particular antenna panel based on a highest of the downlink received L1-RSRP values; and
determine the selected PUCCH resource based on a lowest resource identifier (ID) with the particular antenna panel.

15. The non-transitory computer-readable storage medium of claim 12, wherein the instructions further configure the processor to:
select the particular antenna panel as a same antenna panel that receives the PDCCH with the DCI; and
determine the selected PUCCH resource based on a lowest resource identifier (ID) with the particular antenna panel.

16. The non-transitory computer-readable storage medium of claim 15, wherein the instructions further configure the processor to select the particular antenna panel based at least in part on a transmission configuration indicator (TCI) state of the PDCCH configured to schedule the PUSCH.

17. A method to be performed at a processor of a user equipment (UE) configured for multiple beam operation and including multiple antenna panels, where each of the multiple antenna panels correspond to a respective antenna port group, the method including:
processing reference signals received through the multiple antenna panels from multiple transmission reception points (TRPs) in a wireless network;
processing a physical downlink control channel (PDCCH) to determine the DCI configured to schedule a physical uplink shared channel (PUSCH);
in response to a DCI format of the DCI being DCI format 0_0:
determining a default spatial relation of the PUSCH corresponding to a selected physical uplink control channel (PUCCH) resource configured for at least one of a same antenna panel of the multiple antenna panels that receives the PDCCH with the DCI and a same scheduling TRP of the multiple TRPs that transmits the PDCCH with the DCI; and
determining a particular antenna port group of the PUSCH, the selected PUCCH resource corresponding to the particular antenna port group; and generating the PUSCH to transmit according to the default spatial relation.

18. The method of claim 17, wherein the selected PUCCH resource comprises a lowest resource identifier (ID) within at least one of the same antenna panel and the same scheduling TRP.

19. The method of claim 17, wherein the selected PUCCH resource comprises a lowest resource identifier (ID) within the particular antenna port group.

* * * * *